S. M. FALES.
Cupola Furnace.
No. 835. Reissued Oct. 18, 1859.
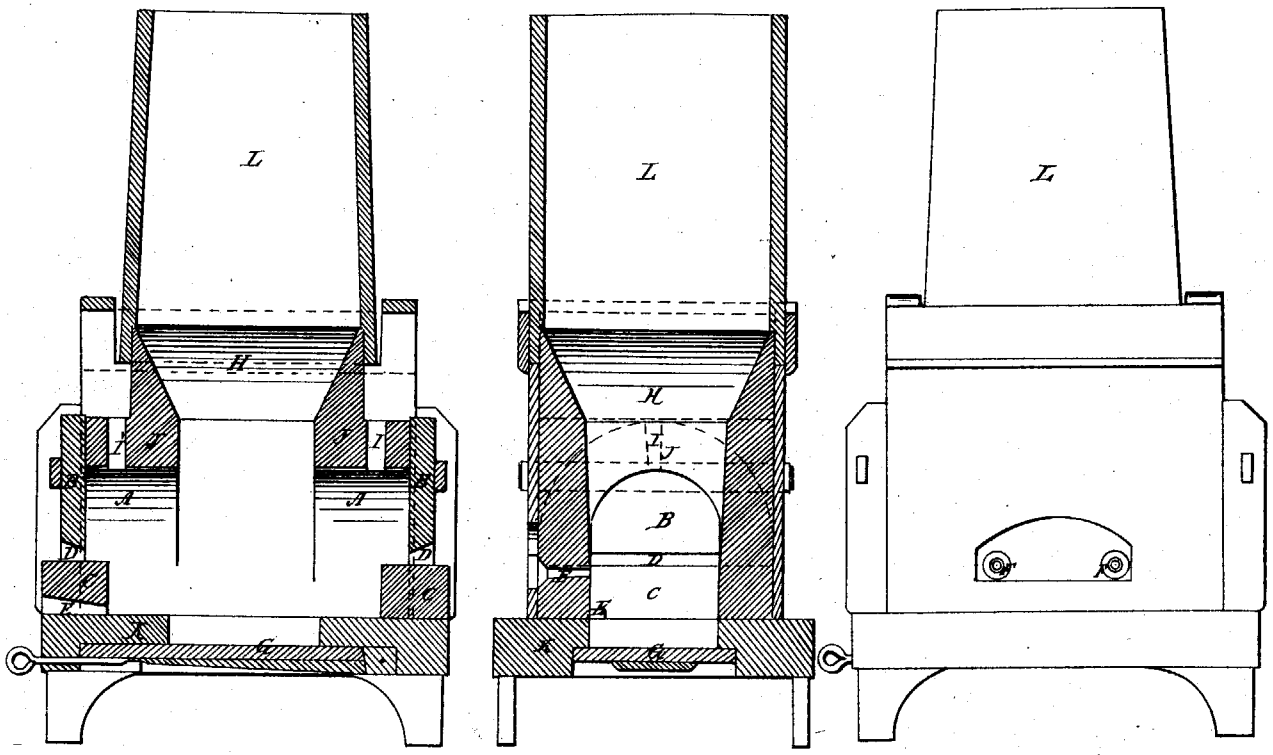
AM. PHOTO-LITHO. CO. N.Y. (OSBORNE'S PROCESS.)

UNITED STATES PATENT OFFICE.

SQUIRE M. FALES, OF BALTIMORE, MARYLAND.

IMPROVED FURNACE FOR SMELTING IRON.

Specification forming part of Letters Patent No. 22,861, dated February 8, 1859; Reissue No. 835, dated October 18, 1859.

*To all whom it may concern:*

Be it known that I, SQUIRE M. FALES, of the city and county of Baltimore, and State of Maryland, have invented a new and Improved Mode of Constructing Furnaces for Melting and Refining Cast-Iron, and also Ores of Various Kinds; and I do hereby declare that the following is a full, clear, and exact description thereof, reference being had to the accompanying drawing, and to the letters annexed to the different parts thereof.

The nature of my invention consists, first, in the combination, with the cone of a furnace, of one or more arched recesses or chambers; second, in the combination of an opening with the crown of the arch or recess; third, in the combination, with the arch or recess and opening in the crown of the same, of a movable tymp to be applied to the outer ends of the arched recesses or chambers, instead of the permanent tymp now in use, which movable tymp is kept in place by a cross-bar that can be removed at pleasure.

By the first feature of my invention the blast is allowed a chance to expand laterally or circulate before it rises in the cone of the furnace, instead of being compelled to pass, as heretofore, directly upward. Thus having the blast circulate I have found in practice causes the substances being melted to have new qualities imparted to them, and they consequently are converted into a better description of metal, and that, too, with a much less consumption of fuel.

By the second feature of my invention provision is made for the introduction, from the outside of this character of furnaces, of any flues necessary to make the furnace work perfectly; and by the third feature facilities for repairing or cleansing the furnace are afforded.

To enable others skilled in the art to make and use my invention I will proceed to describe its construction and operation.

The drawing represents a furnace, as improved by my invention, in three different aspects, A A represent my arch as it passes through the structure below the bosh of the cone, and projects on each side of the furnace so as to form the arched recesses or chambers to which I have alluded, whereby the blast is made to circulate and impart new qualities to the metal before it re-enters the cone, instead of being forced immediately upward, as in the ordinary mode.

B B represent the movable tymp, by which the external openings of the arch are closed, and which can be removed at pleasure for the purpose of cleaning or repairing the furnace, instead of the permanent tymp fixed, as at present, in the sides of the furnace.

C denotes the dam-stone upon which the tymp rests.

D denotes the opening through which the cinders escape.

E represents the notch or outlet for the melted metal; F, the point where the blast is introduced as usual.

G designates the falling bottom, with which the bottom of the furnace is provided, and which may be opened at will for cooling or cleaning the furnace.

H denotes the bosh of the furnace.

I designates the opening in the crown of the arch at the points J, whereby flues necessary to promote the proper working of the furnace are introduced, instead of being thrown, as at present, into the cone.

K represents the bottom of the furnace, and L denotes the cone.

It will be seen at a glance that the three improvements herein described can be introduced at will into any of the furnaces now in use.

What I claim as my invention, and desire to secure by this Reissue, is—

1. The combination, with the cone of a furnace, of one or more arched recesses or chambers, A A, substantially as and for the purposes set forth.

2. The combination of an opening, I, with the crown of the arch A, substantially as and for the purposes set forth.

3. The combination, with the arch recess A. opening I in the crown of the same, of a movable tymp, B B, to be applied to the outer ends of the arched recesses or chambers A A, instead of the permanent tymp now in use, which movable tymp is kept in place by a cross-bar that can be removed at pleasure, substantially as and for the purposes set forth.

S. M. FALES.

Witnesses:

WM. H. HAYWARD,

ORM. SMITH.